Patented Jan. 3, 1939

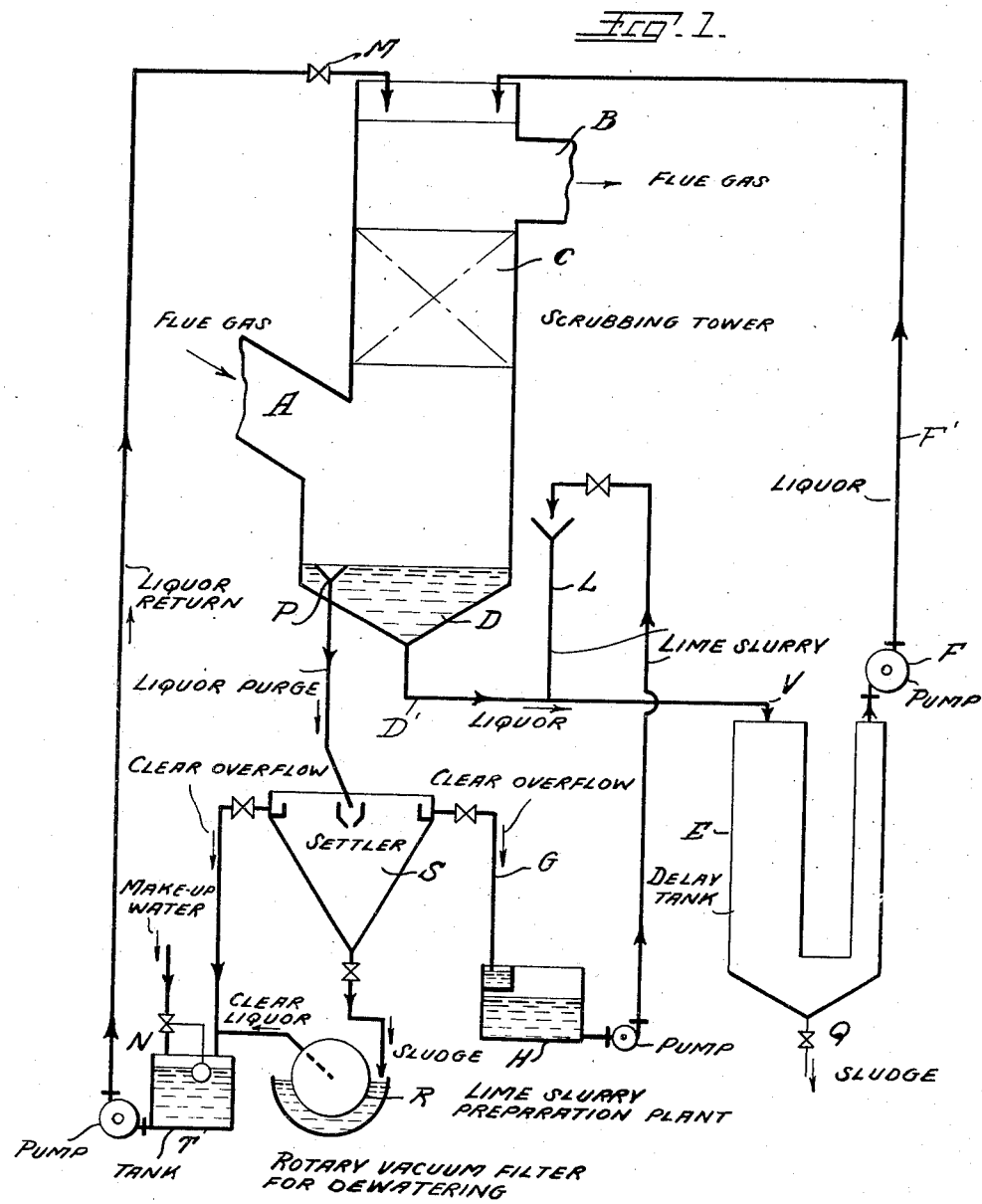

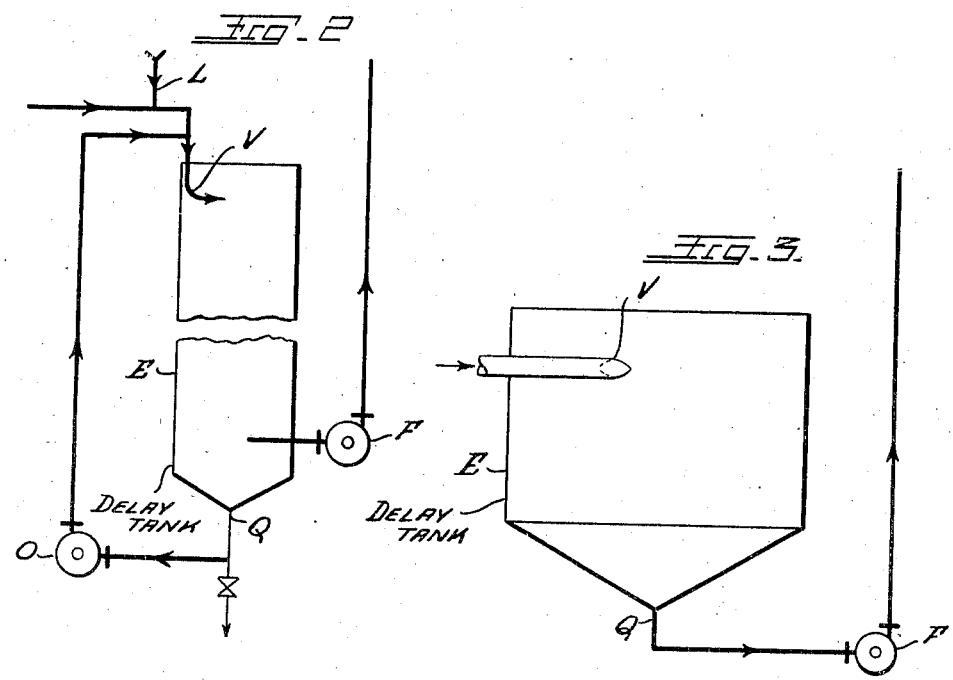
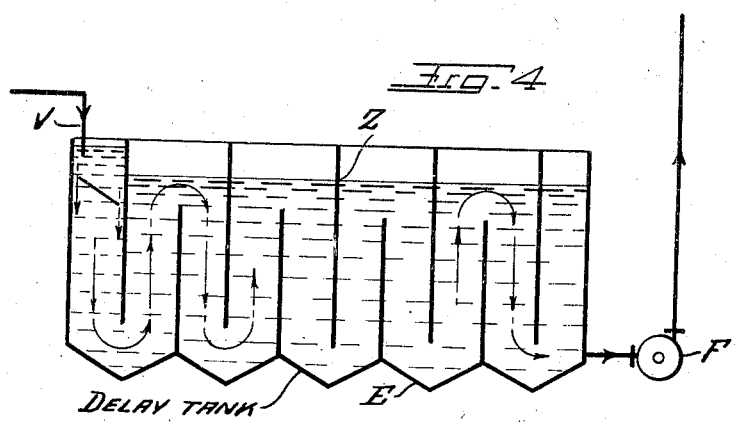

2,142,406

UNITED STATES PATENT OFFICE 2,142,406

APPARATUS FOR THE WET PURIFICATION OF GASES

Gordon Nonhebel and John Lindon Pearson, Norton-on-Tees, England, assignors to Imperial Chemical Industries Limited, a corporation of Great Britain Original application December 27, 1934, Serial No. 759,397. Divided and this application May 28, 1937, Serial No. 145,364. In Great Britain December 28, 1933

8 Claims. (Cl. 23—260)

This invention relates to apparatus for the wet purification of gases, particularly waste flue gases. The primary utility of the invention is to effect the removal from flue gases of oxides of sulphur and any smoke and ash present.

An important object of the invention is to provide an efficient and economical, non-effluent scrubbing system, i. e., a system in which the scrubbing liquor is not discarded upon leaving the scrubber, but is collected, reconditioned to prepare it for further use in the scrubber, and then returned to the scrubber in such condition that no substantial scaling will occur in the scrubber as a result of the repeated use of the liquor. An important advantage of the non-effluent system is that the pollution of waterways is avoided. Another advantage is that the consumption of water is moderate, the only water losses occurring through evaporation and through the discharge of solid refuse in a moist condition.

A further important object of the present invention is to provide a system of the kind referred to which accomplishes the conditioning of the scrubbing liquor for reuse with such rapidity that the amount of liquor in the system may be limited to a moderate volume, with a corresponding limitation of the necessary size and cost of the system.

The invention, though susceptible of other uses, is intended primarily for use in carrying out effectively and efficiently the method disclosed and claimed in our copending joint application, Serial No. 759,397, filed December 27, 1934 (Patent No. 2,090,142) for Wet purification of gases, of which the present application is a division. In hereinafter describing and explaining the apparatus of the invention, its use in practicing the method or process of said copending application will therefore be more particularly referred to.

In the method of that application the sulphur oxides of flue gas or the like are absorbed therefrom by scrubbing the gas with aqueous liquor carrying lime, chalk or other suitable alkaline agent, such as magnesian limestone, which contains lime. In the description and claims of the present application the word "lime" is to be taken to mean any of these substances, that is, it is to be understood as generic to all of them. A principal object of the method disclosed in said application is to prevent scaling upon the surface of the scrubber. The cause of scaling is the presence in the scrubber of a supersaturated solution of calcium sulphite or calcium sulphate, or both. In any non-effluent scrubbing system in which lime is added to the liquor, the liquor entering the scrubber will be saturated or nearly saturated with calcium sulphite and calcium sulphate, and will contain suspended calcium carbonate and dissolved bicarbonate. If the make-up water added to replace losses in the recirculating system due to evaporation and due to losses with the rejected mud (purge) is relatively small, the recirculating liquor will eventually become supersaturated with respect to calcium sulphite and calcium sulphate during passage through the scrubber. This is particularly the case when the above-mentioned purge is clarified in a settler or similar apparatus and the liquor so clarified is returned to the recirculating system.

Calcium sulphite and calcium sulphate readily form supersaturated solutions and it is found that the liquor leaving the scrubber is supersaturated with respect to these salts when the amount thereof formed in the scrubber is in excess of the amount required to saturate the make-up water. Moreover, when the lime is added to the recirculating liquor the pH of the solution is raised and this increase in pH lowers the solubility of the calcium sulphite in the liquor, with the result that the solution may become supersaturated with respect to this salt even in cases when the decrease in pH in the scrubber itself so increases the solubility of calcium sulphite that no saturation or supersaturation with respect to this salt occurs within the scrubber.

It is known that supersaturation can be prevented by seeding with crystals of the salt with respect to which the solution is supersaturated, or with crystals of an isomorphous salt. We have found, however, that in a gas purification process of the type described supersaturation can occur at the base of the scrubber and cause scaling of the scrubbing surfaces in a normal scrubbing system of relatively small total liquor capacity, even when the solids retained in the recirculating liquor system are sufficient to give concentrations of suspended calcium sulphite and sulphate of over 5% each. Moreover, in practice, there is a limit to the quantity of suspended solids which may be carried in the liquor, especially through the scrubber.

According to the process of our prior application aforesaid, deposition of scale on the surfaces inside the scrubber due to crystallization of calcium sulphite and calcium sulphate is substantially prevented by treating the liquor leaving the scrubber so as to remove practically the whole of the supersaturation of the liquor due to calcium sulphite and calcium sulphate, before recirculating it over the scrubbing surfaces. The said treatment of the liquor from the scrubber preferably consists in adding lime to the liquor leaving the scrubber and then in delaying the return of the liquor to the scrubber for a definite minimum time, hereinafter referred to as delay time, while maintaining a definite minimum percentage of calcium sulphite and calcium sulphate suspended in the liquor, to enable desupersaturation of the liquor by crystallization of the reaction products to be substantially completed. In this manner the building up of a highly supersaturated solution during constant recirculation of the liquor is avoided.

Special means for oxidizing calcium sulphite to calcium sulphate may be employed, but these are not essential because considerable oxidation usually occurs in the scrubber itself as a result of excess oxygen in the flue gases and adventitious catalysts in the scrubbing liquor.

In order to carry out our invention, we include a large liquor capacity, hereinafter referred to as the delay tank, in the system, which is much greater than that required to fill normal sized pumping tanks, pipes, hoppers and feed tanks. This capacity, which may be obtained by enlarging the pumping tank or pipes, for example, may be provided at any convenient locality in the liquor circuit outside the scrubber and between the point where the necessary amount of lime is added to the liquor and the point where the liquor again enters the scrubber. Most desirably the delay tank is a separate vessel placed immediately after the point of addition of the lime. The lime is added to the liquor between the scrubber exit and the delay tank, most advantageously immediately after the liquor leaves the scrubber so as to assist the precipitation of calcium sulphite in the delay tank.

The size of the delay tank is calculated to interpose such a liquor capacity between the scrubber exit and scrubber inlet as is required to give the delay time calculated as shown hereinafter.

The delay time required is calculated:

(1) For calcium sulphate, from the normal time taken for the main body of liquor leaving the bottom scrubbing elements to return to the top scrubbing elements;

(2) For calcium sulphite, from the time taken for the main body of liquor to pass from the point of lime addition to the top scrubbing elements.

The delay time required varies principally with functions of:

(1) The extent of supersaturation to be removed.

(2) The inverse of concentration of suspended seeding crystals in the liquor in the delay tank.

It also varies to a lesser degree with:

(3) The inverse of the concentration of non-isomorphic material in suspension.

(4) The inverse of the total ionic strength of the solution.

(5) The inverse of the temperature.

In calculating the delay time required for a particular scrubber the last two factors are usually fixed. The concentration of suspended solids in the liquor is also limited for practical reasons, but it is in practice possible to carry at least 3% each of suspended calcium sulphite and sulphate in the liquor even when scrubbing gas high in dust content, such as flue gas from a powdered fuel boiler. Provision is made to insure that at least 3% each of calcium sulphite and calcium sulphate will be carried in suspension by the liquor throughout the delay time. This may be accomplished by a proper design of the delay tank in relation to other factors, or by withdrawing settled salts and returning them to the liquor entering the delay tank. It is necessary, however, to carry out small scale experiments under precisely the conditions of operation of the full scale to determine the proportions of calcium sulphite and sulphate formed in the scrubbing system, since the extent of the oxidation of the calcium sulphite to calcium sulphate varies with the oxygen content of the flue gas, the design and material of the scrubber packing and the oxidation catalysts accidentally present in the recirculating liquor. It is then possible to calculate the make of calcium sulphite and sulphate during each passage of the liquor through the scrubber from the ratio of liquor and gas rates, and the composition of the gas. Owing to the slowness of desupersaturation, the magnitude of the supersaturation of the liquor at the scrubber exit is nearly equal to this make.

In general, with an average make-up water derived from a stream or canal, the circulating liquor becomes concentrated by evaporation and by absorption of hydrochloric acid from the flue gases to such an extent that its total ionic strength becomes substantially equal to that of sea water saturated with calcium sulphate and sulphite. With sea water make-up, the total ionic strength naturally becomes much greater at equilibrium. The usual temperature attained when scrubbing boiler flue gas is $50°\pm 50°$ C.

The delay time required, with concentrations of at least 3% each of suspended calcium sulphate and sulphite and with average make-up water and with a circulating liquor temperature of $50°\pm 50°$ C., is for calcium sulphate approximately one minute for each milligram equivalent per litre increase in calcium sulphate content per passage of the circulating liquor through the scrubber. With coal containing 2% of sulphur and 50% oxidation of sulphite to sulphate, this increase is approximately 3–4 mg. equiv./litre, and therefore the delay time required would be of the order of 3–4 minutes. The delay time for calcium sulphite is in general substantially less, and is only about half a minute per mg. equiv./litre increase in calcium sulphite make per passage of the circulating liquor. With coal containing 2% of sulphur and 50% oxidation of sulphite to sulphate, this increase is 1.5–2 mg. equivs./litre and the delay time required would therefore be of the order of 1.5–2 minutes. It will therefore be seen that the choice of the delay time to allow for complete crystallization of the calcium sulphate allows in this case adequately for the crystallization of the sulphite. In some cases, however, for example with coals containing 4–5% sulphur and in processes where the oxidation catalysts are relatively ineffective, the make of calcium sulphite may be the controlling factor, and this will be revealed by the previously mentioned small scale experiment.

We have found that in general a separate oxidizer is an advantage only when dealing with coal having an exceptionally high sulphur content, e. g., greater than 4 per cent. In these circumstances the oxidizer may be suitably proportioned or operated to control the conversion of dissolved sulphite to sulphate, so that the delay time necessary for the precipitation of the sulphite may be the same as for the sulphate. Since the lime must be added after the oxidizer it is advantageous to divide the increased capacity necessary according to the present invention so that part of the delay time occurs between the scrubber exit and the oxidizer and the remainder after the oxidizer.

With increase in the concentration of suspended calcium sulphite and sulphate above 3% each, very little decrease in the delay time is possible, and such decrease is of the order of 10% for 6% each of suspended calcium sulphite and sulphate. With decrease in the concentration of suspended calcium sulphite and sulphate below 3% each, the delay time is very substantially increased and may be nearly double for 2% each of suspended calcium sulphate and sulphite.

It is to be noted that in industrial plants the delay time for calcium sulphate is substantially greater than the time taken to desupersaturate a supersaturated solution of this salt in the laboratory with finely divided crystals of gypsum. This is probably due to the impure state and dirty surface of the crystals, which is inevitable in an industrial plant.

In carrying out the process of our copending application, it is important that substantially all of the liquor shall be compelled to consume the calculated delay time in passing through the delay tank; in other words, that there shall be no substantial by-passing. It is also important that at least 3% each of calcium sulphite and calcium sulphate shall be maintained in suspension in the liquor throughout the entire time that the liquor is in transit through the tank.

While it is important that a definite minimum percentage of suspended solids be carried through the delay tank, it is also desirable in normal operations that solids be separated from the liquor and removed from the system at substantially the same rate at which fresh solids are being formed. Such separation may desirably be accomplished by partial settling of the entrained solids in the delay tank. To this end the delay tank is desirably so constructed and arranged in relation to the other parts of the system that a reduced velocity of flow, calculated substantially to balance these requirements, will occur in the delay tank. Valves or other suitable control means may, of course, be utilized to further adjust the flow of the liquor.

In one very desirable and practical embodiment of the invention, a delay tank is provided which takes the form of a long U-tube. The U-tube type of delay tank is particularly useful in plants where the scrubber is on an upper floor of the building and in which it is desired to support the heavy delay tank on the ground.

In another desirable embodiment of the invention a cylindrical delay tank is employed and provision is made of means for introducing the liquor, with its suspended solids, tangentially at the top of the tank and for discharging the liquor from the center of the bottom of the tank.

In still another form of the invention where, for example, the dust concentration in the flue gases is so high that it is undesirable to pass liquor containing a very high proportion of suspended solids through the scrubber, we arrange the delay tank as an elutriator or partial settler and withdraw from its base solution high in suspended solids which we then return to the top of the delay tank. The liquor flowing to the scrubber may also be passed through a liquor cyclone or settler or similar apparatus for the reduction of its content of suspended solids and the part of the suspended solids which it is not required to reject from the system may be returned to the delay tank.

In order to explain further the principles of the invention, apparatus embodying the same in desirable practical form is shown by way of typical example and more or less diagrammatically in the accompanying drawings, wherein Fig. 1 illustrates a typical complete apparatus system embodying the invention; and Figs. 2, 3 and 4 illustrate other specific forms which the delay tank may take.

Fig. 1 shows diagrammatically a general arrangement of a complete plant especially well adapted for use in practicing the method of our copending application aforesaid when the scrubber is located near the roof of the building. In the particular arrangement shown, a delay tank of the unsymmetrical U type is employed, its liquor inlet and liquor outlet being widely separated to provide a path of liquor travel of predetermined length properly correlated to the desired delay period. The flue gas enters a scrubbing tower C at A and leaves at B. The major portion of the liquor collected in a scrubber hopper D is delivered by a conduit D' to a delay tank E (at V) and is returned from the delay tank to the scrubber by a pump F and a conduit F'. This arrangement comprises the main recirculation liquor system.

The descending leg of the delay tank E is of relatively large cross-section as compared with the ascending leg and the U-bend at the bottom, but it is made small enough in relation to the volume of liquor to be transmitted, the natural rate of settling of calcium sulphite and calcium sulphate relative to the liquor, and the solid calcium sulphate and calcium sulphite content of liquor delivered to it, to prevent clarification of the liquor in the upper portion of the leg beyond the point where it still carries at least the desired 3% each of suspended calcium sulphite and calcium sulphate. The upgoing leg of the tank E is made of smaller cross-section than the down-going leg, so that the liquor is caused to travel upward at sufficient velocity to carry at least 3% each of calcium sulphite and calcium sulphate in suspension to the top of the leg.

In order to remove accumulated solids, a portion of the liquor collected in the scrubber hopper D is purged off at the overflow pipe P to the settler S. A part of the clear overflow from this settler passes to the tank T and part is used for mixing the lime slurry. The sludge from the settler is dewatered on a rotary vacuum filter R and the clear liquor collected also in the tank T. The water level in the tank T is maintained constant by addition of make-up water through a float operated valve N. The total rate of purge may therefore be controlled by variation in the supply of returned liquor at the valve M.

Part of the clear settled or filtered liquor is passed by the line G to lime supply means comprising a lime slurry preparation plant or mixing unit H. This lime slurry is added to the liquor in the circulating liquor system by pumping it from the mixing unit into conduit D', as shown, at a locality between the scrubber liquor outlet and the delay tank E. In order to hasten desupersaturation, it is preferable to use only clarified liquor which is already saturated with calcium sulphate and sulphite for the preparation of the lime slurry, and to use as thick a slurry as is practicable whilst ensuring complete mixing at the point of addition to the recirculating liquor system. Moreover, it is preferable to add the make-up water and the residual clarified liquor to the liquor after the delay tank, in order that any residual supersaturation left after the delay tank may be reduced or removed by the dilution effected by the make-up water. Any sludge settling in the delay tank may be removed at the sludge point Q. The delay tank, however, is purposely designed to assure that at least three per cent each of calcium sulphate and calcium sulphite will be maintained in suspension and not allowed to settle out. The cross-sections of the downgoing and upgoing legs, and of the U-bend at the bottom of the delay tank, are chosen with the purpose of promoting this result.

Fig. 2 shows a tall and wide delay tank which is a variant of that shown in Fig. 1. In this case the circulating liquor pump F is placed near the bottom of the delay tank, and the delay tank may also be designed as a partial settler. The thick sludge collecting in this delay tank may be recirculated from the sludge point Q by the pump O back to the top of the delay tank in order to retain a higher concentration of suspended solids in the liquor in the tank than in the liquor passing over the scrubbing elements so as to ensure more rapid desupersaturation. In order to ensure the maximum delay time in a tank of this shape, the liquor is fed into the top tangentially at V so as to impart a rotatory motion to the liquid and prevent direct short circuiting to the outlet.

Fig. 3 shows an ordinary cylindrical squat delay tank in which the liquor is fed in tangentially at the top at V and withdrawn at the center of the bottom at Q, in order to prevent short circuiting.

Fig. 4 shows a rectangular delay tank fitted with baffles Z to ensure the maximum average delay time for the liquor and the minimum of settling.

It is obvious from the foregoing that the principles of the invention may be embodied in apparatus differing considerably in specific detail and arrangement from that herein shown and described by way of illustrative example.

What is claimed is:

1. A gas purifying system comprising a scrubber having inlets and outlets for gas and washing liquor respectively, a liquor-circulating system, including conduit means, arranged to receive liquor discharged by said scrubber at the liquor outlet and to return it to the scrubber at the liquor inlet, a delay tank included in said liquor-circulating system, said delay tank being so constructed and proportioned, and having an inlet and an outlet disposed in such relation to each other, that liquor flowing continuously through the tank between said inlet and outlet is required to follow a substantially definite path of predetermined length properly correlated to the delay period necessary to effect desired desupersaturation of the liquor with respect to calcium sulphite and calcium sulphate, lime supply means, and conduit means connecting said supply means with said circulating system and arranged to deliver lime thereinto at a locality between the scrubber outlet and the delay tank inlet, said purifying system further including a settler arranged to receive only a part of the liquor discharged from the scrubber, said lime supply means comprising a mixing unit, and means for conducting clarified liquor into the mixing unit from the settler for preparing a slurry of lime to be introduced into the circulating system.

2. A gas purifying system as defined in claim 1, which further includes, means for withdrawing sludge from the settler, means for separating liquor from the sludge, and means for returning the separated liquor to the scrubber.

3. A gas purifying system as defined in claim 1, which further includes conduit means for returning clarified liquor from the settler to the scrubber, and means for adding make-up water to the liquor at a locality between the settler and the scrubber.

4. A gas purifying system as claimed in claim 1, in which the delay tank consists of a U-tube.

5. A gas purifying system as claimed in claim 1, in which the delay tank consists of a U-tube having descending and ascending legs of different cross-sectional areas, the ascending leg being of less cross-sectional area than the descending leg.

6. A gas purifying system as claimed in claim 1, in which the delay tank takes the form of a cylindrical tank having means for introducing liquor tangentially at the top and means for withdrawing liquor centrally at the bottom.

7. A gas purifying system as claimed in claim 1, in which the delay tank is constructed and proportioned to function as a settler and in which provision is made of means for withdrawing liquor high in suspended solids from the base of the delay tank and for returning such liquor together with the suspended solids to the top of the tank.

8. Apparatus for the purification of gases resulting from the combustion of sulphur-containing fuel, comprising a scrubber provided with gas and liquor inlets and outlets, a settler, conduit means for passing a minor portion of the used liquor direct from said scrubber to said settler, conduit means for passing clarified liquor from the settler back to the scrubber, a delay tank having a liquor inlet and a liquor outlet which are widely separated, and providing a substantially definite path of predetermined length for flow therethrough of liquid in large volume, conduit means for passing the bulk of the used liquor direct from said scrubber to the inlet of said delay tank, lime supply means connected to the last-mentioned conduit means for introducing lime thereinto, said supply means comprising a mixing unit and means for conducting clarified liquor thereinto from the settler for preparation of lime slurry, and means for recirculating liquor from the outlet of said delay tank to the liquor inlet of said scrubber.

GORDON NONHEBEL.
JOHN LINDON PEARSON.